US007813477B2

(12) United States Patent
Harding et al.

(10) Patent No.: US 7,813,477 B2

(45) Date of Patent: Oct. 12, 2010

(54) X-RAY DIFFRACTION DEVICE, OBJECT IMAGING SYSTEM, AND METHOD FOR OPERATING A SECURITY SYSTEM

(75) Inventors: Geoffrey Harding, Hamburg (DE); Stephan Olesinski, Hamburg (DE); Dirk Kosciesza, Schleswig-Holstein (DE); Helmut Rudolf Strecker, Hamburg (DE); Jeffrey Seymour Gordon, Niskayuna, NY (US)

(73) Assignee: Morpho Detection, Inc., Newark, CA (US)

( * ) Notice: Subject to any disclaimer, the term of this patent is extended or adjusted under 35 U.S.C. 154(b) by 0 days.

(21) Appl. No.: 12/398,784

(22) Filed: Mar. 5, 2009

(65) Prior Publication Data

US 2010/0226478 A1 Sep. 9, 2010

(51) Int. Cl.
*G01N 23/20* (2006.01)

(52) U.S. Cl. ........................................ 378/87; 378/149

(58) Field of Classification Search .................. 378/57, 378/86, 87, 88, 89, 149

See application file for complete search history.

(56) References Cited

U.S. PATENT DOCUMENTS

| | | | | |
|---|---|---|---|---|
| 4,096,391 | A | 6/1978 | Barnes | |
| 6,175,615 | B1 * | 1/2001 | Guru et al. | 378/149 |
| 7,092,485 | B2 | 8/2006 | Kravis | |
| 7,141,812 | B2 | 11/2006 | Appleby et al. | |
| 7,410,606 | B2 | 8/2008 | Appleby et al. | |
| 7,411,204 | B2 | 8/2008 | Appleby et al. | |
| 7,462,852 | B2 | 12/2008 | Appleby et al. | |

(Continued)

FOREIGN PATENT DOCUMENTS

WO 2004106906 A1 12/2004

OTHER PUBLICATIONS

L. Tunn, P. Barclay, R. J. Cernik, K. H. Khor, W. O'Neill and P. Seller, The manufacture of a very high precision x-ray collimator array for rapid tomographic energy dispersive diffraction imaging (TEDDI), Jun. 7, 2006, 10 pages, Online at stacks.iop.org/MST/17/1767, IOP Publishing Ltd., United Kingdom.

(Continued)

*Primary Examiner*—Chih-Cheng G Kao
(74) *Attorney, Agent, or Firm*—Armstrong Teasdale LLP

(57) ABSTRACT

An x-ray diffraction imaging device includes at least one x-ray detector and at least one scatter collimator positioned upstream of the at least one x-ray detector. The at least one collimator includes a plurality of successive plates. Each of the plurality of plates defines a plurality of rectangular holes. The plurality of successive plates are arranged such that the plurality of rectangular holes define a plurality of quadrilateral passages extending through the at least one scatter collimator. Each of the plurality of quadrilateral passages is configured to increase a rate of detection of first x-rays that define an x-ray transit path enclosed within a single such quadrilateral passage. Also, the plurality of quadrilateral passages is configured to decrease a rate of detection of second x-rays that define an x-ray transit path that intersects more than one such quadrilateral passage.

20 Claims, 9 Drawing Sheets

U.S. PATENT DOCUMENTS

| | | | |
|---|---|---|---|
| 2003/0128813 | A1 | 7/2003 | Appleby et al. |
| 2003/0235272 | A1 * | 12/2003 | Appleby et al. ............. 378/147 |
| 2006/0291622 | A1 | 12/2006 | Smith et al. |
| 2008/0013688 | A1 * | 1/2008 | Harding ...................... 378/147 |
| 2008/0053638 | A1 | 3/2008 | Appleby et al. |
| 2008/0175347 | A1 | 7/2008 | Tkaczyk et al. |
| 2008/0246180 | A1 | 10/2008 | Appleby et al. |

OTHER PUBLICATIONS

G. Harding, X-Ray Diffraction Imaging—A Multi-Generational Perspective, Applied Radiation and Isotopes, Feb. 2009, pp. 287-295, vol. 67, Issue 2, ISSN 0969-8043, JARI, ScienceDirect, Elsevier.

European Patent Office, Search Report GHS/P513332EP for Application No.: EP 10 15 5711, Morpho Detection, Inc., May 26, 2010, 3 pages.

* cited by examiner

X-RAY DIFFRACTION DEVICE, OBJECT IMAGING SYSTEM, AND METHOD FOR OPERATING A SECURITY SYSTEM

BACKGROUND OF THE INVENTION

1. Field of the Invention

The embodiments described herein relate generally to operating security systems and, more particularly, to an x-ray diffraction device and a method for operating a security system having such x-ray diffraction device.

2. Description of Related Art

Many known security systems include an object imaging system that is configured with fan-beam detection technology employing known x-ray diffraction devices. Many of these known fan-beam x-ray diffraction imaging devices include at least one x-ray source to generate a single x-ray fan-beam having multiple photon energies. These screening devices also include a first collimator that facilitates forming the fan-beam. Such devices further include at least one x-ray detector and at least one second collimator that receive at least a portion of a scatter x-ray flux subsequent to interaction of the fan-beam with a piece of the item. The x-ray detector receives at least a portion of the scatter x-ray flux and generates a detector response in the form of a detector signal that is subsequently used to generate an image of the object as discussed further below. These known security systems, wherein such devices are embedded, use coherent x-ray scatter techniques to screen individuals' baggage items with a fan-beam that illuminates a portion of the item, thereby forming an interrogation volume within the item. Such security systems also generate a two-dimensional (2-D) cross-sectional image that facilitates discovery of contraband items and substances.

The fan-beam generated by the device typically illuminates only a portion of a large item and movement of the x-ray source and/or the detector is required to illuminate the entire item and interrogate the entire volume of the item. Moreover, multiple regions separated spatially from one another in the same section of the item must be scanned sequentially as well. Scanning of such items using such known devices requires a finite period of time to scan the entire 2-D cross-section of the item, and thereby illuminate the entire interrogation volume in sequential increments to form a three-dimensional (3-D) image.

Specifically, there may be a large degree of variability in item size and shape that may include irregular surfaces, indentations, and projections, as well as interior and exterior pockets and overlapping contents in the item. Such items will require additional and/or longer scans of these areas, thereby extending a total scan time. Moreover, a spatial resolution of the device, that is, the ability of the device to sharply and clearly define the extent or shape of features within the generated image, varies as a distance between the interrogated volume and the second collimator and detector varies as the collimator and the detector move about the item. Varying such distance tends to vary the properties of the fan-beam, thereby varying the spatial resolution.

In addition, many of such known fan-beam x-ray diffraction imaging devices include components that are arranged and configured to facilitate mechanical movement of either, or all of, the x-ray source, the collimators, and the detector. Such mechanical movement requires motive components that increase the size, weight, and cost of the device. Moreover, such motive components typically require routine inspections, preventative maintenance activities, and occasional corrective maintenance activities. Further, owners will typically maintain a spare parts inventory associated with mechanical movement. The aforementioned activities and spare parts inventories tend to increase a total cost of ownership of the fan-beam x-ray diffraction imaging devices.

Moreover, many known fan-beam x-ray diffraction imaging devices include secondary collimators with symmetrical apertures through which scatter x-rays are transmitted before reaching the detector. Such collimators facilitate cross-talk scattering of x-rays, that is, directing scattered x-rays that propagate through the secondary collimator to combine with desired, or legitimate scattered x-rays to reach the detector and generate false alarms for certain contraband materials and substances. Moreover, such secondary collimators permit only a small proportion of the useful scatter x-ray beam to reach the detector and therefore limit the detector signal. As a consequence of the small detector signal the detection efficiency is impaired. Moreover, an increased number of false alarms are generated. Such false alarms typically require manual inspection of the associated items with the attendant expense of security resources to conduct the inspection and inconvenience to both the owner of the associated items and the security resources. Accordingly, it would be desirable to provide a fan-beam x-ray diffraction imaging device with a method of operation that decreases and/or eliminates movement of the device components and permits the entire useful scatter x-ray beam to reach the detector and inhibits the passage of cross-talk x-rays through the secondary collimator.

BRIEF SUMMARY OF THE INVENTION

In one aspect, an x-ray diffraction imaging device is provided. The device includes at least one x-ray detector and at least one scatter collimator positioned upstream of the at least one x-ray detector. The at least one scatter collimator includes a plurality of successive plates. Each of the plurality of plates defines a plurality of rectangular holes. The plurality of successive plates are arranged such that the plurality of rectangular holes define a plurality of quadrilateral passages extending through the at least one scatter collimator. Each of the plurality of quadrilateral passages is configured to increase a rate of detection of first x-rays that define an x-ray transit path enclosed within a single such quadrilateral passage. Also, the plurality of quadrilateral passages is configured to decrease a rate of detection of second x-rays that define an x-ray transit path that intersects more than one such quadrilateral passage.

In another aspect, an object imaging system is provided. The system includes at least one computer processor and an x-ray diffraction imaging device coupled to the at least one computer processor. The device includes at least one x-ray detector and at least one scatter collimator positioned upstream of the at least one x-ray detector. The at least one scatter collimator includes a plurality of successive plates. Each of the plurality of plates defines a plurality of rectangular holes. The plurality of successive plates are arranged such that the plurality of rectangular holes define a plurality of quadrilateral passages extending through the at least one scatter collimator. Each of the plurality of quadrilateral passages is configured to increase a rate of detection of first x-rays that define an x-ray transit path enclosed within a single such quadrilateral passage. Also, the plurality of quadrilateral passages is configured to decrease a rate of detection of second x-rays that define an x-ray transit path that intersects more than one such quadrilateral passage.

In still another aspect, a method for operating a security system is provided. The method includes directing an x-ray fan-beam from a substantially stationary x-ray source toward a substantially stationary x-ray detector with at least one object positioned therebetween. The method also includes scattering at least a portion of the x-ray fan-beam within at least a portion of the at least one object, thereby forming an x-ray scatter beam. The method further includes transmitting at least a portion of the x-ray scatter beam through a plurality of quadrilateral passages positioned upstream of the x-ray detector. Each of the plurality of quadrilateral passages is configured to increase a rate of detection of first x-rays that define an x-ray transit path enclosed within a single such quadrilateral passage. Also, the plurality of quadrilateral passages is configured to decrease a rate of detection of second x-rays that define an x-ray transit path that intersects more than one such quadrilateral passage.

Embodiments of the method and device described herein facilitate effective and efficient operation of a security system by decreasing time of using, and cost owning, a fan-beam x-ray diffraction imaging device for the associated security system. The x-ray diffraction imaging device described herein significantly decreases mechanical movements of the imaging device components and facilitates substantial parallel imaging and analysis of items under scrutiny. Therefore, the method and imaging device disclosed herein results in providing the user with a visual three-dimensional (3-D) image of the items under scrutiny at a lower cost with faster results, substantially regardless of the physical attributes of the scrutinized items. Moreover, the x-ray diffraction imaging device described herein significantly increases the useful scatter signal incident on the scatter detector and also decreases a probability of a cross-talk x-ray arriving at the detector, thereby increasing detection efficiency and decreasing a probability of false alarm generation for contraband substances and materials.

BRIEF DESCRIPTION OF THE DRAWINGS

FIGS. 1-8 show exemplary embodiments of the imaging devices, systems, and methods described herein.

FIG. 1 is a schematic view of an exemplary security system.

FIG. 2 is a schematic perspective view of an exemplary fan-beam x-ray diffraction imaging (XDI) device that may be used with the security system shown in FIG. 1.

FIG. 3 is a schematic perspective view of a portion of the fan-beam XDI device shown in FIG. 2.

FIG. 4 is schematic cross-sectional view of an exemplary collimator that may be used with the imaging device shown in FIG. 2.

FIG. 5 is a schematic view of an exemplary collimator plate that may be used in the collimator shown in FIG. 4.

FIG. 6 is an exploded view of an exemplary secondary collimator that may be used with the imaging device shown in FIG. 2.

FIG. 7 is a perspective view of the secondary collimator shown in FIG. 6.

DETAILED DESCRIPTION OF THE INVENTION

Figure 1:
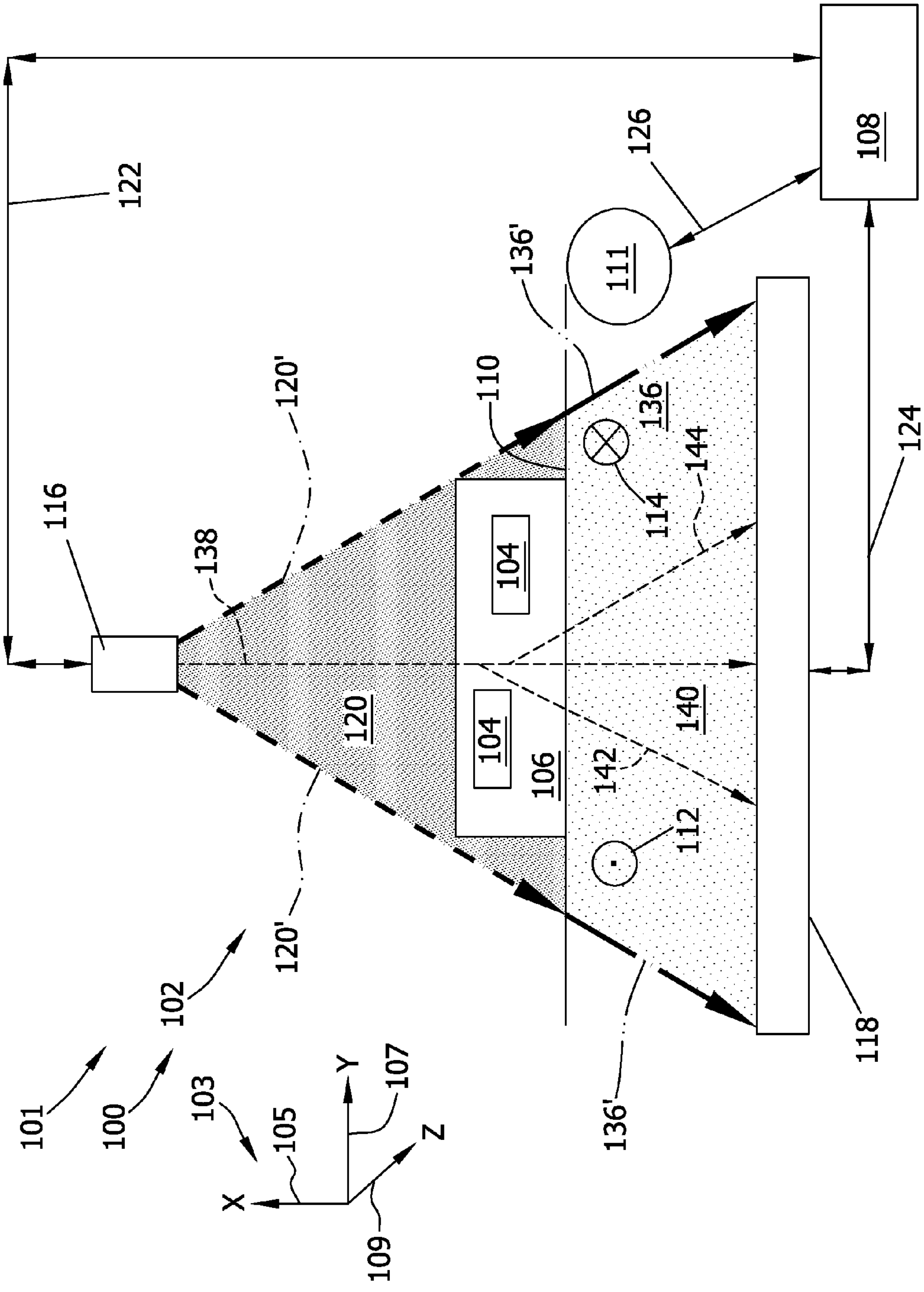

The method and x-ray laminography device described herein facilitate effective and efficient operation of security systems. The security systems include an effective fan-beam x-ray diffraction imaging device that significantly decreases mechanical movements of the imaging device components and facilitates substantial parallel imaging and analysis of items under scrutiny. Specifically, such x-ray diffraction imaging device generates an x-ray fan beam in which all object volume elements (voxels) in a two-dimensional (2-D) object section are analyzed in parallel to generate a three-dimensional (3-D) image of the object and items residing therein. Also, specifically, such x-ray diffraction imaging device includes a multi-plane secondary collimator that transmits a divergent scatter x-ray fan beam utilizing a large portion of the useful scattered x-rays while decreasing cross-talk x-rays. Therefore, the method and imaging device disclosed herein results in providing the user with a visual three-dimensional (3-D) image of the items under scrutiny at a lower cost with faster results, substantially regardless of the physical attributes of the scrutinized items. Further, the method and imaging device disclosed herein results in increasing the signal of legitimate scattered x-rays while decreasing the number of cross-talk x-rays, thereby increasing the detection rate and decreasing a number of false alarms associated with contraband substances and materials. Moreover, the fan-beam x-ray diffraction imaging device described herein has a sufficiently small footprint to facilitate inclusion within many existing security checkpoints.

A first technical effect of the fan-beam x-ray diffraction imaging device and method described herein is to provide the user of the security system described herein with a reduction in the scanning time of each item being scrutinized. This first technical effect is at least partially achieved by constant spatial resolution over the entire object section and complete and simultaneous object coverage. A second technical effect of the device and method described herein is to reduce capital, maintenance and operational costs associated with ownership of such security system. This second technical effect is at least partially achieved by eliminating detector movement and relying exclusively on conveyor belt movement as the only mechanical movement required to perform 3-D scans, thus reducing size and cost of the imaging device. A third technical effect of the device and method described herein is to increase detection rate and reduce the number of false alarms associated with contraband substances and materials. This third technical effect is at least partially achieved by reducing scatter cross-talk and executing an immediate analysis of alarm regions identified in other screening techniques.

At least one embodiment of the present invention is described below in reference to its application in connection with and operation of a security system for monitoring, alarming, and notification. However, it should be apparent to those skilled in the art and guided by the teachings provided herein that a plurality of embodiments of the invention are likewise applicable to any suitable system requiring security screening of a large number of items of varying shapes in a short time frame with little to no false alarms.

At least some of the components of the object imaging systems and security systems described herein include at least one processor and a memory, at least one processor input channel, and at least one processor output channel. As used herein, the term "processor" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, without limitation, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD)

may also be used. Also, in the embodiments described herein, additional input channels may include, without limitation, computer peripherals associated with an operator interface such as a mouse and a keyboard. Alternatively, other computer peripherals may also be used that may include, for example, without limitation, a scanner. Furthermore, in the exemplary embodiment, additional output channels may include, without limitation, an operator interface monitor.

The processors as described herein process information transmitted from a plurality of electrical and electronic components that may include, but not be limited to, security system inspection equipment such as fan-beam x-ray diffraction imaging devices. Such processors may be physically located in, for example, but not limited to, the fan-beam x-ray diffraction imaging devices, desktop computers, laptop computers, PLC cabinets, and distributed control system (DCS) cabinets. RAM and storage devices store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident security system control commands. The execution of sequences of instructions is not limited to any specific combination of hardware circuitry and software instructions.

FIG. 1 is a schematic view of an exemplary object imaging system 100 including an exemplary fan-beam x-ray diffraction imaging (XDI) device 102. In the exemplary embodiment, object imaging system 100 is integrated within a larger, more comprehensive security system 101. Security system 101 is configured to operate both for checked luggage and carry-on luggage in airport security as well as at security checkpoints (not shown) where it is configured to scan larger-profile items, such as suitcases and shipping crates. Also, in the exemplary embodiment, device 102 is a massively-parallel (MP) stationary x-ray diffraction imaging (XDI) device, or, more specifically, a third generation area-parallel XDI device. Such third generation XDI devices are characterized with a measurement rate of approximately 10,000 object volume elements (voxels) per second as compared to first generation XDI devices (approximately 1 voxel per second) and second generation XDI devices (approximately 100 voxels per second).

In the exemplary embodiment, object imaging system 100 is configured to inspect items that include, without limitation, small objects 104 that may be carried by individuals (not shown) in their associated luggage 106. Moreover, in the exemplary embodiment, object imaging system 100 includes at least one computer processor, or a, more specifically, a computer processing system 108. Computer processing system 108 includes sufficient information technology resources to record, analyze, synthesize and correct data collected. The information technology resources may include, without limitation, processing, memory, and input/output (I/O) resources as described above. Data processing techniques provide the technical effect of forming a three-dimensional (3-D) image representative of small objects 104 and luggage 106 and contents therein.

Computer processing system 108 may include equipment (not shown) such as, but not limited to, printers, desk top computers, laptop computers, servers, and hand-held devices, such as personal data assistants (PDAs), that perform system and network functions that include, but are not limited to, diagnostics, reporting, technical support, configuration, system and network security, and communications.

As described above, in the exemplary embodiment, object imaging system 100 includes computer processing system 108 and the resources of processing system 108 are dedicated to object imaging system 100. Alternatively, computer processing system 108 may be a part of and/or integrated within a larger processing system (not shown) associated with a remainder (not shown) of security system 101. That is, computer processing system 108 may be coupled with other systems and networks (neither shown) via a local area network (LAN) or Wide Area Network (WAN) (neither shown). Moreover, computer processing system 108 may be coupled with other systems and networks including, but not limited to, a remote central monitoring station via the Internet and/or a radio communications link (neither shown), wherein any network configuration using any communication coupling may be used. Alternatively, in contrast to being a portion of a larger system, computer processing system 108 may be solely associated with x-ray diffraction device 102.

For illustration and perspective, FIG. 1 shows a coordinate system 103 that includes an x-axis 105 (substantially representing a vertical dimension), a y-axis 107 (substantially representing a horizontal, longitudinal, or lengthwise dimension), and a z-axis 109 (substantially representing a depth, traverse, or widthwise dimension). Each axis is orthogonal to each other axis. In the exemplary embodiment, defining orientation of object imaging system 100, security system 101, and fan-beam XDI device 102 with coordinate system 103 as described herein facilitates consistent perspective within this disclosure. Alternatively, any orientation of systems 100 and 101 and device 102 may be used, without limitation, that enables systems 100 and 101 and device 102 as described herein.

Object imaging system 100 also includes a traveling belt 110 and belt drive apparatus 111. Belt drive apparatus 111 is operatively coupled in motive operation of belt 110. Apparatus 111 includes at least one of an electric drive motor, a hydraulic drive motor, a pneumatic motor, and/or a gearbox (not shown), and/or any other suitable device. Apparatus 111 drives belt 110 primarily in the substantially longitudinal, or lengthwise direction, or orientation as indicated by direction arrow 112 substantially parallel to z-axis 109 and is shown to be exiting FIG. 1. Apparatus 111 is reversible such that belt 110 also travels with an oscillating motion in the substantially longitudinal, or lengthwise direction, or orientation as indicated by a bidirectional arrow 114 substantially parallel to z-axis 109 and is shown to be entering and exiting FIG. 1. That is, apparatus 111 drives belt 110 to travel in a direction reverse to that of arrow 112 and then drives belt 110 to travel in the direction of arrow 112 to facilitate multiple scans by x-ray diffraction device 102. One technical effect of exemplary fan-beam x-ray diffraction imaging device 102 as described herein is to reduce a necessity for using such reversible features of apparatus 111 and belt 110.

In the exemplary embodiment, x-ray diffraction device 102 includes at least one x-ray source and primary collimator combination 116 and at least one scatter, or secondary collimator and x-ray detector combination 118. X-ray source/primary collimator combination 116 and secondary collimator/x-ray detector combination 118 may include any suitable devices known in the art. X-ray source/primary collimator combination 116 is configured to generate and transmit an x-ray fan-beam 120 and secondary collimator/x-ray detector combination 118 is configured to receive at least a portion both of a scattered x-ray beam (discussed further below), as well as at least a portion of primary x-ray beam 120 as defined by primary x-ray beam edges 120'.

Luggage 106 is positioned downstream of X-ray source/primary collimator combination 116 and is illuminated by at least a portion of primary x-ray beam 120. At least a portion of primary x-ray beam 120 passes through and/or around luggage 106 with little or no interaction, thereby forming an unscattered x-ray fan-beam 136 as defined by unscattered x-ray fan-beam edges 136'. In the exemplary embodiment, one primary x-ray 138 from primary x-ray beam 120 is illustrated to interact with luggage 106 to form a first scatter ray 142. It then transits through luggage 106 to form a second scatter ray 144. The undeflected primary x-ray 138 eventually exits the object. X-ray scatter forms a scatter, or secondary x-ray beam 140 that is induced along the entire path of primary x-ray 138 in the object. Primary x-ray 138 and secondary x-ray beam 140 including at least scatter rays 142 and 144 are discussed further below. Generation, transmission, and receipt of primary x-ray beam 120 and secondary x-ray beam 140 are collectively referred to herein as a "shot".

In the exemplary embodiment, x-ray source/primary collimator combination 116, secondary collimator/x-ray detector combination 118, secondary x-ray beam 140 and x-ray fan-beam 120 includes a transverse orientation with respect to bidirectional arrow 114. Alternatively, combinations 116 and 118 and beams 120 and 140 have any orientation that enables object imaging system 100, security system 101, and fan-beam x-ray diffraction imaging device 102, each as described herein. Also, in the exemplary embodiment, combinations 116 and 118 and beams 120 and 140 are substantially stationary. Such substantially stationary configuration facilitates reducing movements of combinations 116 and 118, primary beam 120, and secondary beam 140 and oscillating travel of belt 110 via apparatus 111, thereby facilitating extending an expected operational lifetime of those components associated with such movement and decreasing a period of time associated with scanning of objects 104 and luggage 106. Moreover, eliminating such movement facilitates elimination of associated components, thereby facilitating decreasing a cost and footprint of object imaging system 100, security system 101, and x-ray diffraction device 102.

In the exemplary embodiment, computer processing system 108 is coupled with components of object imaging system 100 including x-ray source/primary collimator combination 116, secondary collimator/x-ray detector combination 118, and belt drive apparatus 111 via communication conduits 122, 124, and 126, respectively. Computer processing system 108 substantially controls and coordinates operation of combinations 116 and 118 and apparatus 111 to illuminate objects 104 and luggage 106 with x-ray fan-beam 120 as described herein.

Figure 2:
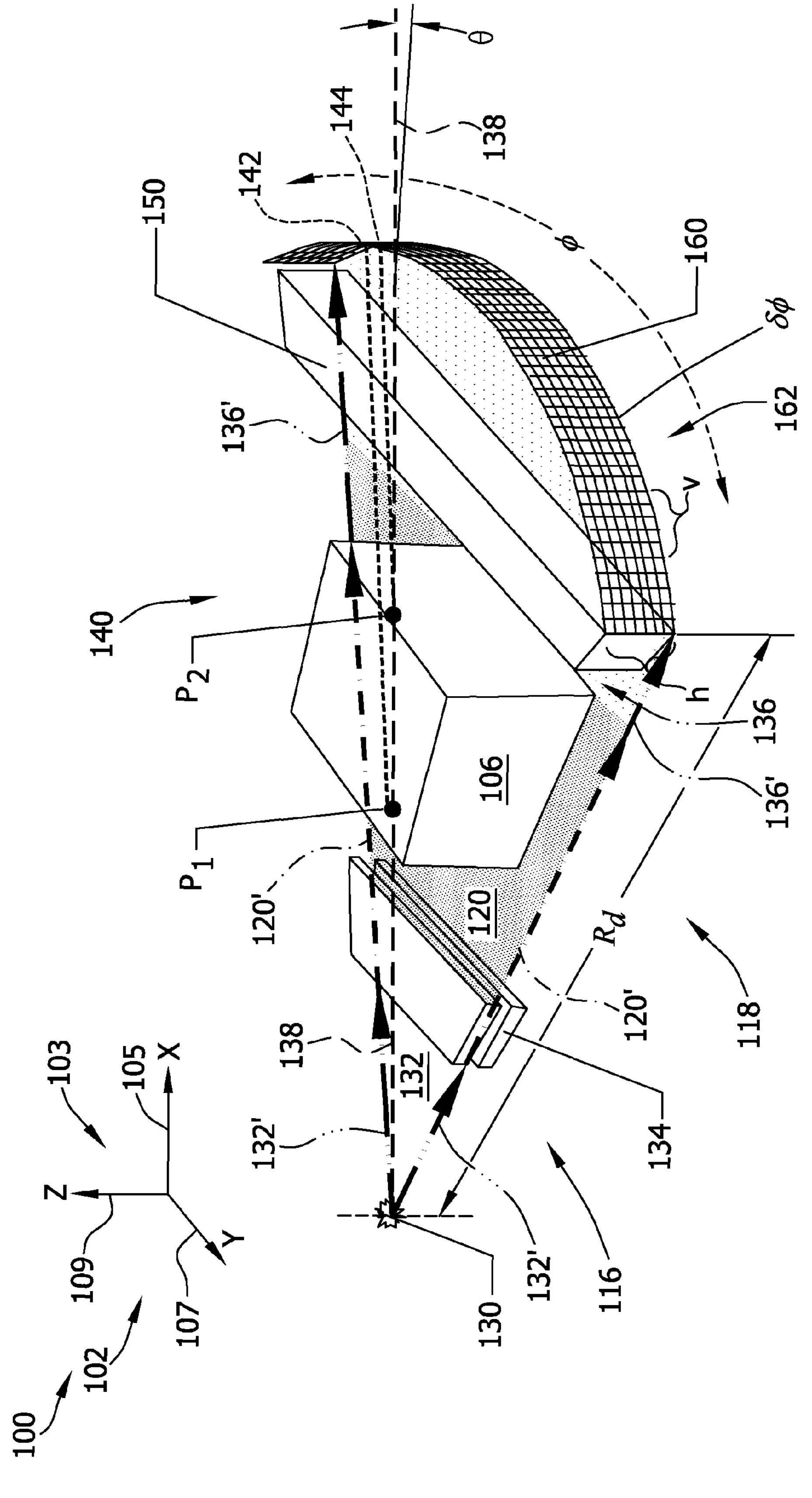

FIG. 2 is a schematic perspective view of exemplary fan-beam XDI device 102 that may be used with the security system shown in FIG. 1. As discussed above, device 102 is a stationary MP XDI device, or, more specifically, a third generation area-parallel XDI device with a measurement rate of approximately 10,000 object volume elements (voxels) per second. Coordinate system 103, including x-axis 105 (substantially representing a vertical dimension), y-axis 107 (substantially representing a horizontal, longitudinal, or lengthwise dimension), and z-axis 109 (substantially representing a depth, traverse, or widthwise dimension) are illustrated for consistent perspective.

In the exemplary embodiment, as discussed above, fan-beam XDI device 102 includes an x-ray source/primary collimator combination 116. Combination 116 includes a radiation source 130 that, in the exemplary embodiment, generates and transmits a substantially polychromatic x-ray stream 132 as defined by x-ray stream edges 132'. Radiation source 130 is positioned at the origin of coordinate system 103. Alternatively, without limitation, radiation source 130 is any source emitting any form of radiation that enables device 102 as described herein. Combination 116 also includes a primary collimator 134 that is positioned downstream of radiation source 130. Primary collimator 134 receives at least a portion of x-ray stream 132 that is incident on primary collimator 134 and forms thin fan-beam, or primary x-ray beam 120 as defined by primary x-ray beam edges 120'. In the exemplary embodiment, primary x-ray beam 120 is substantially formed in an x-y plane (not shown) defined by x-axis 105 and y-axis 107 and has a thickness value of approximately 1 millimeter (mm), or less, as measured in the dimension defined by z-axis 109, wherein an x-z plane (not shown) is defined by x-axis 107 and z-axis 109.

Luggage 106 is positioned downstream of primary collimator 134 and is illuminated by at least a portion of primary x-ray beam 120. At least a portion of primary x-ray beam 120 passes through luggage 106 with little or no interaction, thereby forming an unscattered x-ray fan-beam 136 as defined by unscattered x-ray fan-beam edges 136'. In the exemplary embodiment, one primary x-ray 138 from primary x-ray beam 120 is illustrated to transmit through primary collimator 134 and interact with luggage 106 at point $P_1$ to form a first scatter ray 142. It then transits through luggage 106 to a point $P_2$ to form a second scatter ray 144. The undeflected primary x-ray 138 eventually exits luggage 106. Points $P_1$ and $P_2$ are shown for illustration. X-ray scatter forms a scatter, or secondary x-ray beam 140 and is induced along the entire path of x-ray 138 in the object. Primary x-ray 138 and secondary x-ray beam 140 including at least scatter rays 142 and 144 are discussed further below.

Also, in the exemplary embodiment, as discussed above, fan-beam XDI device 102 includes a secondary collimator/detector combination 118. Combination 118 includes a scatter, or secondary collimator 150. Secondary collimator 150 comprises a two-dimensional arrangement of quadrilateral passages (neither shown), that is, quadrilateral passages in the horizontal plane and quadrilateral passages in the vertical plane. The horizontal quadrilateral passages have widths of approximately 10 mm, are spaced approximately 10 mm apart from each other and they converge at a focus defined by x-ray source 130. The vertical quadrilateral passages are oriented at a constant angle θ to the x-y plane and are spaced approximately 1 mm apart from each other.

Further, in the exemplary embodiment, combination 118 includes a detector array 160 positioned immediately downstream of secondary collimator 150. Detector array 160 is a 2-D pixellated detector array that is fabricated from, without limitation, energy-resolving detector materials that include compounds of cadmium, zinc, and tellurium, for example, but not limited to, CdZnTe. Specifically, detector array includes a plurality of detector pixels 162, wherein pixels 162 define a plurality of vertical columns "v" and a plurality of horizontal rows "h" about an angular range of ϕ. Radiation transmitted through luggage 106 to form unscattered x-ray fan-beam 136 is recorded in the lowest row (h=0) of detector array 160.

In the exemplary embodiment, for primary x-ray 138 of fan-beam 132 having coordinate ϕ in the x-y plane relative to the axis, secondary collimator 150 passes secondary x-ray beam 140 including scatter rays 142 and 144 with angular coordinates ϕ and θ relative to the x-y plane. More specifically, one set of vertical quadrilateral passages with a constant ϕ value within secondary collimator 150 facilitate that a certain detector column v is only able to "see" object voxels lying in a narrow strip of angular width, or partial arc δϕ about angular range ϕ of detector array 160. Moreover, one set of horizontal quadrilateral passages transmits only radiation scattered at the constant angle θ, relative to the primary ray 138. By virtue of the secondary collimator, a certain detector pixel outputs an energy spectrum of x-rays scattered at constant angle from a small region of the object. This energy spectrum is processed to yield the diffraction profile of material in this small region.

Device 102 includes source 130, primary collimator 134, secondary collimator 150, and detector array 160 located at a radial distance $R_d$ from source 130. Therefore, the x-y coordinates of a voxel that scatters directly and legitimately into a detector pixel having coordinates (h, ϕ) are:

$$x=[R_d-h/\tan\theta]*\cos\phi \quad (1)$$

$$y=R_d*\sin\phi \quad (2)$$

In the exemplary embodiment, a technical effect of illuminating luggage 106 with object imaging system 100 is that detector array 160 generates a plurality of energy spectra from a two-dimensional distribution of voxels in luggage 106 and objects 104 residing therein. Another technical effect of illuminating luggage 106 with object imaging system 100 is that computer processing system 108 analyzes the plurality of energy spectra in parallel to generate a two-dimensional x-ray diffraction image of luggage 106 and objects 104 residing therein.

Specifically, in the exemplary embodiment, each 2-D object section is imaged in parallel onto 2-D detector array 160 by secondary collimator 150. An energy spectrum of fixed-angle scatter at the small angle of approximately 0.04 radians from an object irradiated by polychromatic x-rays of energy between 40 kiloelectron-volts (keV) and 140 keV can be directly converted into an x-ray diffraction (XRD) profile by computer processing system 108. Thus XRD profiles are measured in-parallel from many object voxels comprising a 2-D object section, and the voxels lying on a planar 2-D surface of luggage 106 are simultaneously analyzed by 2-D pixellated, energy-resolving detector array 160 within computer processing system 108. In a similar manner, an energy spectrum of fixed-angle scatter at the small angle of approximately 0.02 radians from an object irradiated by polychromatic x-rays of energy between 80 keV and 240 keV can be directly converted into an x-ray diffraction (XRD) profile. Also, in a similar manner, an energy spectrum of fixed-angle scatter at the small angle of approximately 0.01 radians from an object irradiated by polychromatic x-rays of energy between 30 keV and 100 keV can be directly converted into an x-ray diffraction (XRD) profile. Therefore, the energy spectrum of the scattered x-rays is inversely proportional to the scatter angle.

Figure 3:
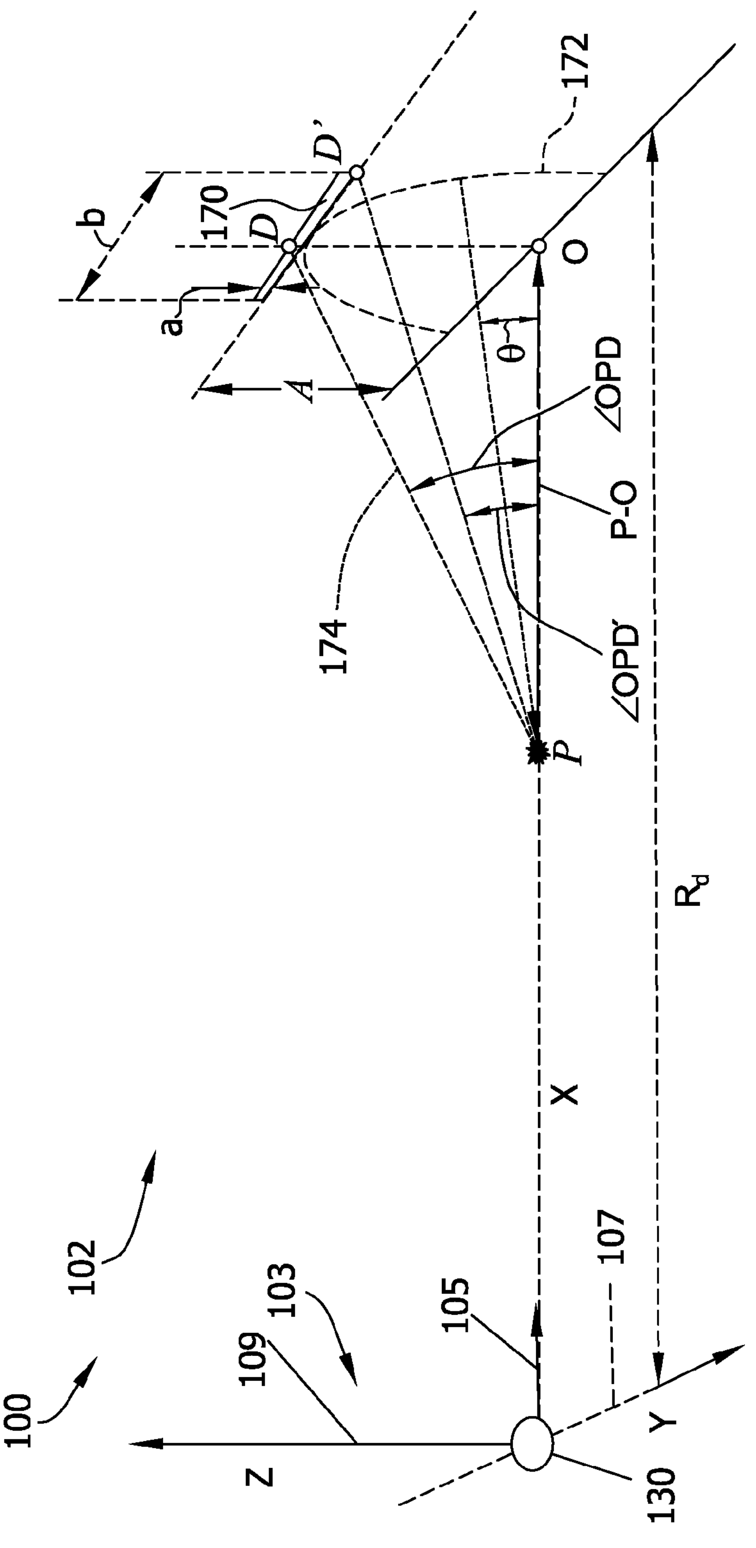

FIG. 3 is a schematic perspective view of a portion of fan-beam XDI device 102. Primary collimator 134 and secondary collimator 150 (both shown in FIG. 2) are not illustrated in FIG. 3 for clarity. Also, for purposes of illustration, detector 160 (shown in FIG. 2) is replaced with a detector element 170 that is substantially rectangular with a height a parallel to z-axis 109 and a length b parallel to y-axis 107. Source 130 is positioned radial distance $R_d$ from a point O directly along x-axis 105 and a point P is positioned therebetween defining a line segment P-O that represents a distance between points P and O. Point O is positioned a distance A directly under a point D that substantially bifurcates detector element 170. X-rays (not shown in FIG. 3) are transmitted from point source 130 in an x-y fan-beam plane defined by x-axis 105 and y-axis 107. X-rays incident at suitcase point P are scattered into rectangular detector element 170 element parallel to y-axis 107 that is displaced distance A from the x-y plane. The locus of x-rays scattered at P having constant angle of scatter θ is substantially represented by semi-circle 172 having a center at point O. Here, the angle of scatter θ is represented as:

$$\text{Angle of scatter } \theta=\tan^{-}(A/P-O) \quad (3)$$

X-rays scattered at point P towards point D at the top of detector element 170 define an in-plane scatter path 174 that define an in-plane scatter angle ∠OPD wherein:

$$\text{In-plane scatter angle } \angle OPD\approx[(a+A)/P-O] \quad (4)$$

Similarly, x-rays scattered at point P towards a point D' positioned at the bottom of a corner of detector element 170 define a skew scatter angle ∠OPD' to the corner of detector element 170, wherein:

$$\text{Skew scatter angle } \angle OPD'\approx\text{sqrt}[(b/2)^2+A^2]/P-O \quad (5)$$

Note that angles ∠OPD and ∠OPD', both out of the x-y plane, are shown exaggerated. Elementary algebra readily shows, when second order terms in the equation are neglected, that these two angles ∠OPD and ∠OPD' are equal when:

$$b=\text{sqrt}[8aA] \quad (6)$$

The above relationships are discussed further below.

Figure 4:
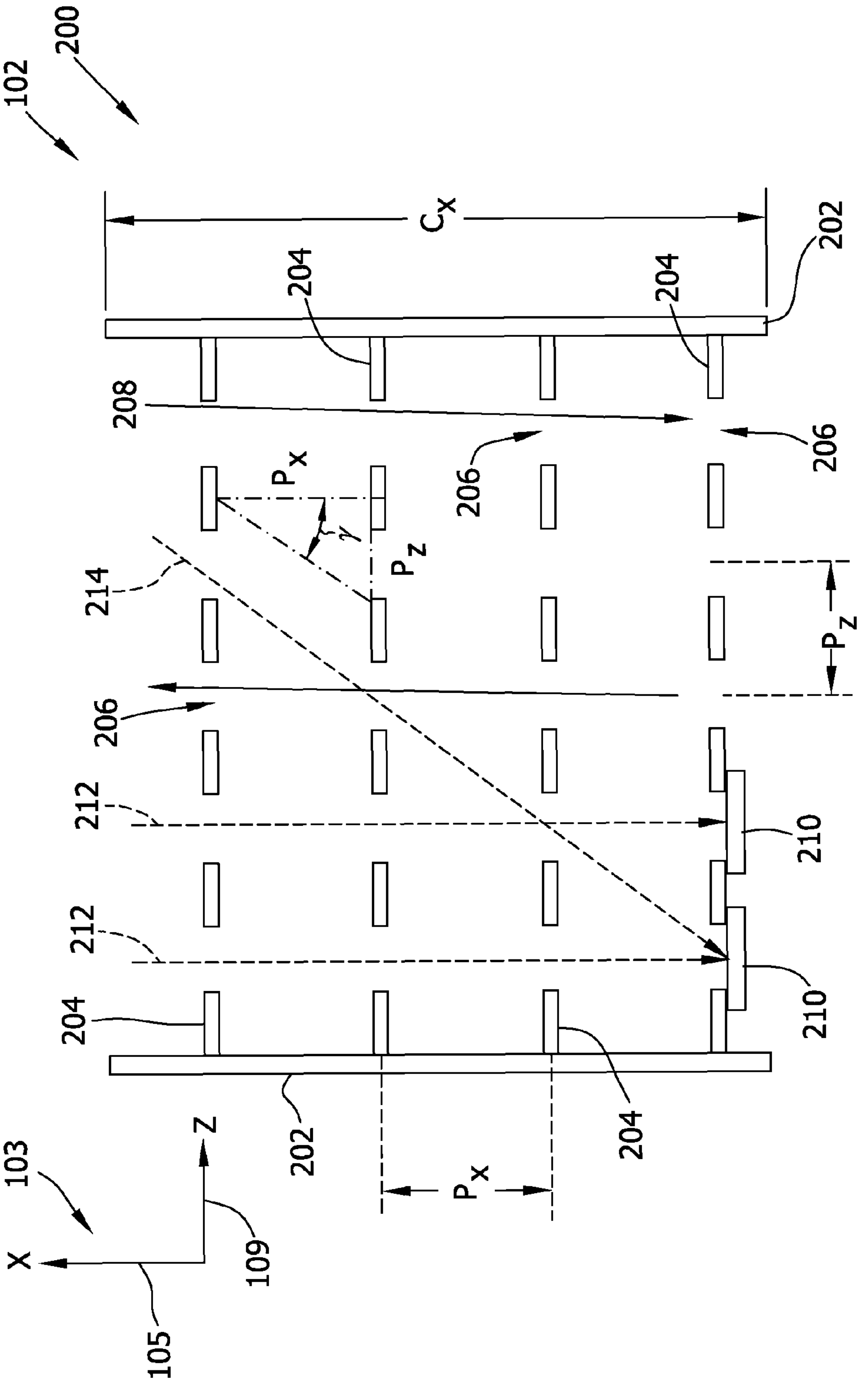

FIG. 4 is schematic cross-sectional view of an exemplary scatter, or secondary collimator 200 that may be used with fan-beam XDI device 102. Secondary collimator 200 is similar to secondary collimator 150 (shown in FIG. 2). Secondary collimator 200 includes two walls 202 that are substantially parallel to x-axis 105. Walls 202 define a total height $C_x$ of secondary collimator 200, wherein, in the exemplary embodiment, total height $C_x$ is approximately 500 mm. Secondary collimator 200 also includes a plurality of aperture planes 204 that are substantially parallel to z-axis 109 and that define a planar pitch $P_x$ along wall 202. Each aperture plane 204 also defines a plurality of holes 206 that further define a detector pitch $P_z$ along each aperture plane 204, wherein, in the exemplary embodiment, detector pitch $P_z$ is approximately 1 mm. Consecutive holes 206 define a plurality of passages 208 that are substantially parallel to x-axis 105. A plurality of substantially stationary x-ray detector elements 210 (only two of N detector elements shown) are positioned just downstream of each passage 208, wherein, in the exemplary embodiment, number of detectors N is 30.

FIG. 4 illustrates two desired, or legitimate scatter x-rays 212 shown traveling substantially parallel to x-axis 105. It should be noted that in reality these scatter rays travel at an angle of approximately 40 milliradians relative to x-axis 105. This angle is small enough such that it is neglected in FIG. 4. FIG. 4 also illustrates a cross-talk scatter x-ray 214 entering secondary collimator 200 at a minimum cross-talk x-ray angle γ that, due to the positioning and orientation of the holes 206 and planes 204 in secondary collimator 200, may reach detector elements 210. To facilitate such cross-talk scatter x-rays 214 being absorbed by collimator walls 202, the tangent of minimum cross-talk ray angle γ is expressed as:

$$\tan\gamma=P_z/P_x \quad (7)$$

wherein:

$$P_z/P_x\geqq N*P_z/C_x \quad (8)$$

from which it follows that:

$$P_x\leqq C_x/N \quad (9)$$

Substituting the values of 500 mm for $C_x$ and 30 detector elements as given above into Equation (9), the minimum separation of at least 2 adjacent planes 204 should be less than approximately 16 mm in order to absorb cross-talk scatter rays propagating in the x-z plane.

Therefore, a minimum separation, or planar pitch $P_x$ of two adjacent planes 204 to ensure that no cross-talk scatter x-rays 214 along z-axis 109 can traverse secondary collimator 200 is determined. In the exemplary embodiment, secondary collimator 200 inhibits cross-talk scatter x-rays 214 that would falsify a signal (not shown) generated and transmitted by detector elements 210, thereby facilitating improved detection performance of object imaging system 100 and security system 101 (both shown in FIG. 1) for contraband materials.

Minimizing planar pitch $P_x$ of two adjacent planes 204 as described above facilitates forming successive holes 206 within associated passage 208 with consistently increasingly larger holes 206 (such increasing illustrated and discussed further below), wherein such constant angular broadening further reduces a potential for cross-talk scatter x-rays 214 to reach detector elements 210 while facilitating a potential for desired, or legitimate scatter x-rays 212 to reach detector elements 210.

Referring again to FIG. 3, a shape of holes 206 (shown on FIG. 4) is derived that maximizes a detection solid angle at constant angular broadening, wherein a solid angle of detector element 170 is defined as a perceived scattering area of detector element 170 divided by a square of a distance P-D between scattering point P and point D on detector element 170. Given the small values associated with the scattering angles of the x-rays at point P, a value of the cosine of these angles is approximately unity, therefore the perceived scattering area is similar to approximately the actual area of detector element 170, or the product of height a and length b.

Typical values of height A are in the range of approximately 30 mm to approximately 100 mm. Also, typical values of angle θ are in the range approximately 0.03 radians to approximately 0.1 radians. Further, typical values of detector array height a are in the range of approximately 0.5 mm to approximately 2.0 mm. Therefore, typical values of detector array length b are in the range of approximately 11 mm to approximately 40 mm.

Noting that at small values of angle θ, tan θ=θ. Solving Equation (3) above for height A, and using a typical value for distance P-O of approximately 100 mm, and using a typical value of angle θ of approximately 0.04 radians, a typical value of height A is approximately 40 mm. Using such a typical value of height A in Equation (6) above in conjunction with a typical value of detector array height a of approximately 1.0 mm, indicates that detector array length b can be approximately 18 times larger than height a for equal angular broadening. Moreover, the detector solid angle is proportional to the product of height a and length b, as describe above. Therefore, for optimum performance of detector element 170, the broadening contributions arising from height a and length b of detector element 170 are approximately equal. Further, therefore, plates 204 of secondary collimator 200 advantageously define holes 206 (all shown in FIG. 4) having a substantially rectangular shape, where the dimensions of the sides of the rectangle are related as given in Equation (6).

Figure 5:
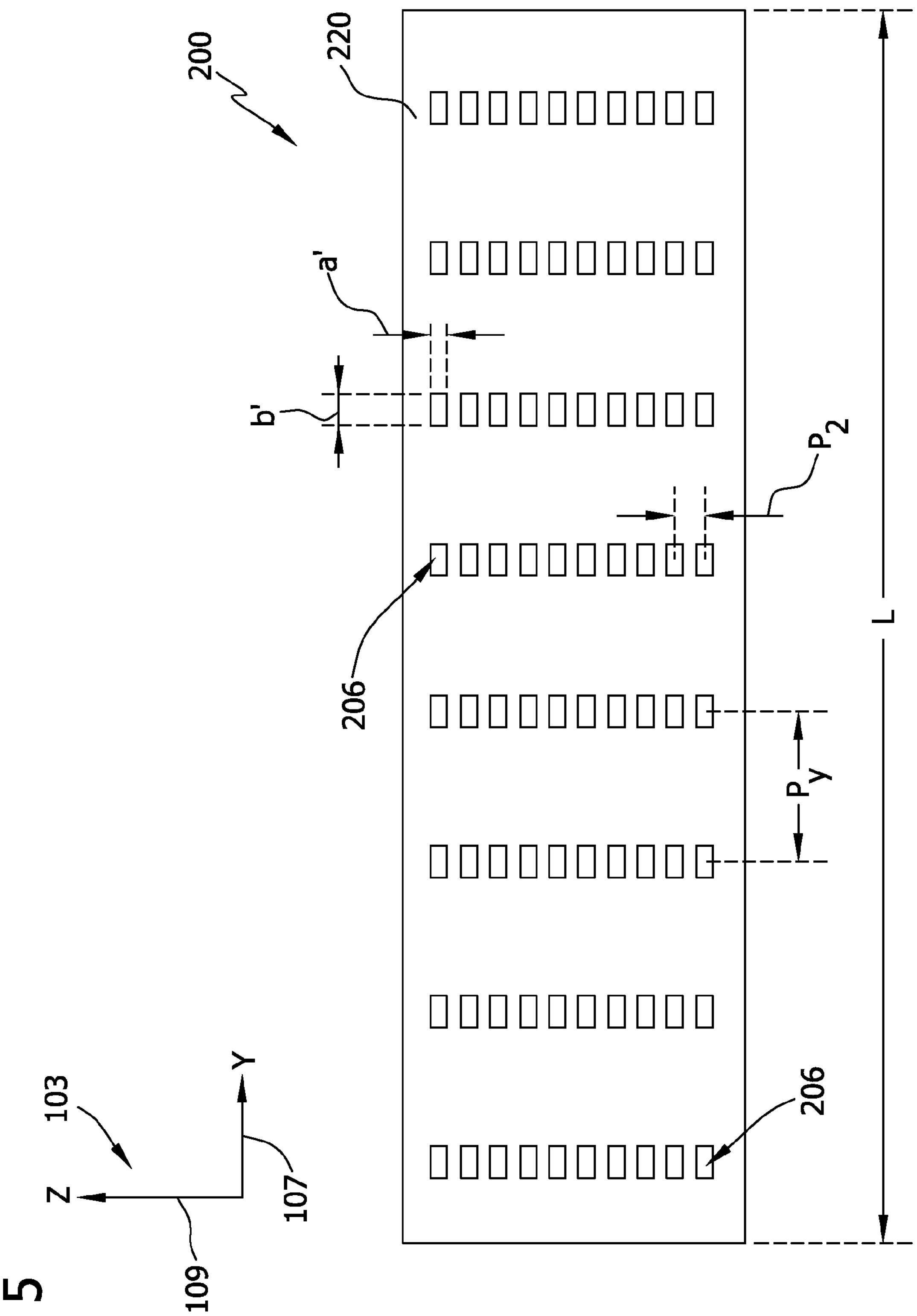

FIG. 5 is a schematic view of an exemplary collimator plate 220 that may be used in secondary collimator 200. Collimator plate 220 is positioned within secondary collimator 200 to replace at least one aperture plane 204 (shown in FIG. 4). Collimator plate 220 includes a plate length L. The material may be any other material with a high atomic number that readily absorbs x-rays and is relatively easy to machine including, without limitation, tungsten having a thickness of approximately 500 micrometers (μm). Holes 206 may be formed by one of several techniques including, without limitation, etching, casting, die-cutting, and laser drilling.

Moreover, holes 206 have dimensions that include a rectangular hole height a' as measured parallel to z-axis 109 and a rectangular hole length b' as measured parallel to y-axis 107. Each successive collimator plate 220 includes an increasing value of hole length b' and an increasing value of plate length L, both proportional to a distance (not shown) away from an x-ray source (not shown) they are to be positioned. In contrast, height a' remains constant. In the exemplary embodiment, each first pair of adjacent holes 206 (such first adjacency defined with respect to y-axis 107) includes a hole pitch $P_y$ defined between geometric centers of first adjacent holes 206. In the exemplary embodiment, values of hole pitch $P_y$ increase with increasing values of hole length b' and plate length L in successive collimator plates 220, wherein hole pitch $P_y$, b' and plate length L increase in proportion to distance from x-ray source 130 (shown in FIG. 2) along x-axis 105, as illustrated and discussed further below. Also, in the exemplary embodiment, each second pair of adjacent holes 206 (such second adjacency defined with respect to z-axis 109) includes detector pitch $P_z$ defined between geometric centers of second adjacent holes 206. In the exemplary embodiment, values of detector pitch $P_z$ is constant with constant values of height a' in successive collimator plates 220, as illustrated and discussed further below.

Figure 6:
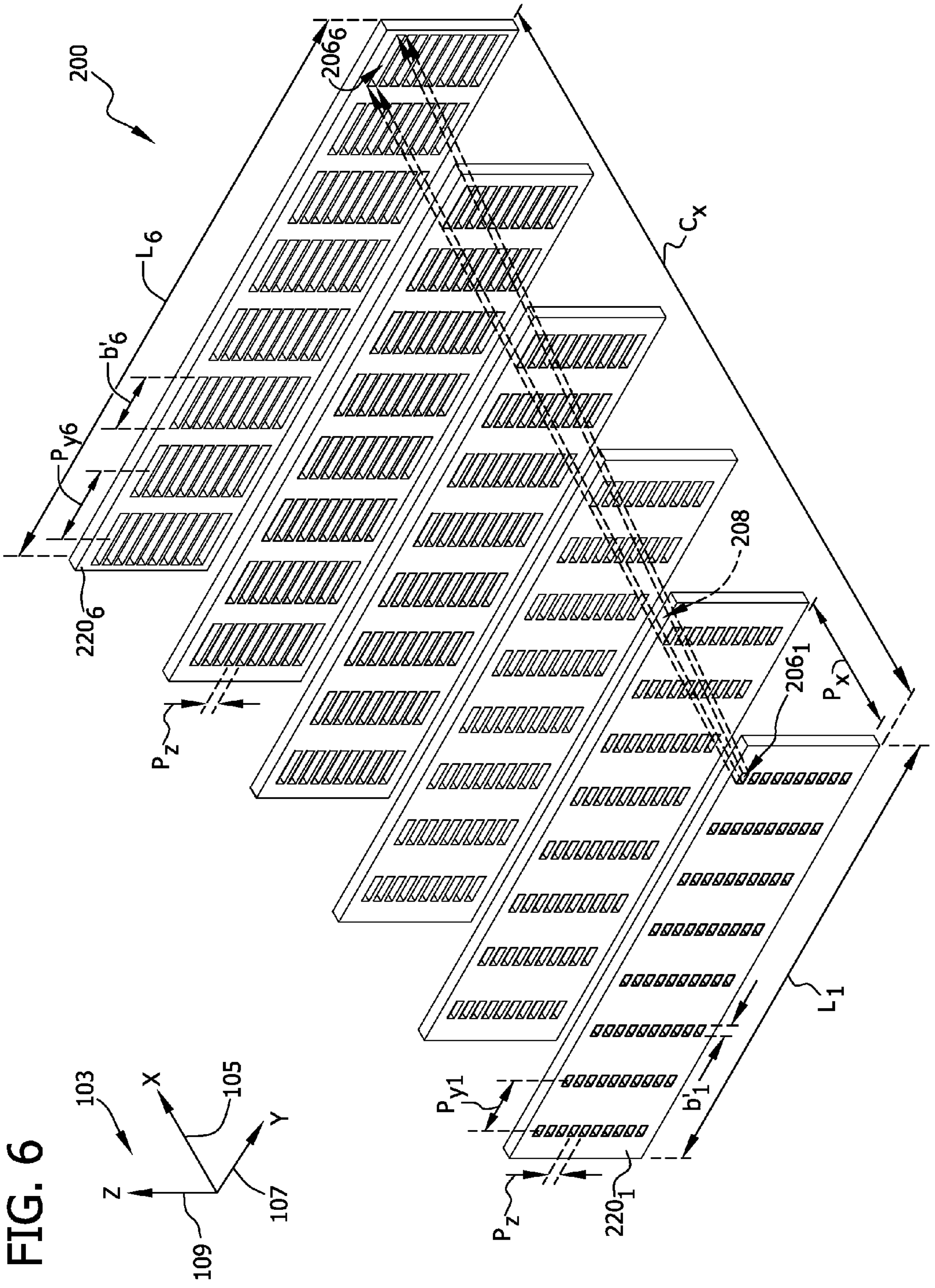

FIG. 6 is an exploded view of exemplary secondary collimator 200 that may be used with exemplary fan-beam XDI device 102 (shown in FIG. 2). Secondary collimator 200 includes a plurality of plates 220, wherein each plate 220 is separated by a constant planar pitch $P_x$. In the exemplary embodiment, secondary collimator includes six plates 220, that is six plates from first plate $\mathbf{220}_1$ to sixth plate $\mathbf{220}_6$. Counting in the direction of increasing increments parallel to x-axis 105, each successive hole 206, that is from first hole $\mathbf{206}_1$ to sixth hole $\mathbf{206}_6$, has a greater hole length b' parallel to y-axis 107 than previous plate 220, wherein length b' of hole $\mathbf{206}_6$ is functionally equivalent to length b' (shown in FIG. 5). More specifically, a hole length $b'_6$ (associated with sixth plate $\mathbf{220}_6$) is greater than a hole length $b'_1$ (associated with first plate $\mathbf{220}_1$) as well as the associated holes lengths (not shown) therebetween, and b' increases in proportion to distance from x-ray source 130 (shown in FIG. 2) along x-axis 105.

Also, in the exemplary embodiment of secondary collimator 200, hole pitch $P_y$ separating the centers of adjacent holes 206 increases with successive plates 220 and plate length L increases with successive plates 220, wherein hole pitch $P_y$ and plate length L increase in proportion to distance from x-ray source 130 (shown in FIG. 2) along x-axis 105. Counting in the direction of increasing increments parallel to x-axis 105, each successive plate 220 has a hole pitch $P_y$ parallel to y-axis 107 than previous plate 220. More specifically, a hole pitch $P_{y6}$ (associated with sixth plate $\mathbf{220}_6$) is greater than a hole pitch $P_{y1}$ (associated with first plate $\mathbf{220}_1$) as well as the associated hole pitches $P_y$ (not shown) therebetween, and $P_y$ increases in proportion to distance from x-ray source 130 (shown in FIG. 2) along x-axis 105. Similarly, counting in the direction of increasing increments parallel to x-axis 105, each successive plate 220 has a plate length L parallel to y-axis 107 than previous plate 220. More specifically, a plate length $L_6$ (associated with sixth plate $\mathbf{220}_6$) is greater than a plate length $L_1$ (associated with first plate $\mathbf{220}_1$) as well as the associated plate lengths L therebetween, and L increases in proportion to distance from x-ray source 130 along x-axis 105. In the exemplary embodiment, plate length $L_6$ is approximately 30% larger than plate length $L_1$.

Further, in the exemplary embodiment of secondary collimator 200, each successive hole 206 has a substantially similar hole height a' parallel to z-axis 109 as previous plate 220, wherein height a' of hole 206 is functionally equivalent to height a' (shown in FIG. 5), and detector pitch $P_z$ is substantially constant with successive plates 220. Therefore, each of passages 208 optimizes a detection solid angle by constant angular broadening as discussed above. Moreover, secondary collimator 200 defines two orthogonal focusing modes. That is, holes 206 converge on an x-ray source (not shown in FIG. 6) in a direction substantially parallel to x-axis 105. Furthermore, holes 206 are substantially parallel in a perpendicular direction, that is, z-axis 109.

In the exemplary and all alternative embodiments of secondary collimator 200, a sufficient number of plates 220, without limitation, are used to define total height of collimator $C_x$ that enables secondary collimator 200 as described herein. Moreover, in the exemplary and all alternative embodiments of secondary collimator 200, without limitation, any number of holes 206 are defined in each plate 220 with any configuration of rows and columns that enables secondary collimator 200 as described herein.

Also, in the exemplary and all alternative embodiments of secondary collimator 200, without limitation, each hole 206 has any height a' and any length b' that enables secondary collimator 200 as described herein. Further, in the exemplary and all alternative embodiments of secondary collimator 200, without limitation, each plate 220 is separated from each successive plate 220 by any planar pitch $P_x$ that enables secondary collimator 200 as described herein. Moreover, in the exemplary and all alternative embodiments of secondary collimator 200, without limitation, at least some holes 206 that are positioned just upstream of detector elements 210 (shown in FIG. 4) are separated from each other by any detector pitch $P_z$ (shown in FIG. 4) that enables secondary collimator 200 as described herein.

Further, in the exemplary and all alternative embodiments of secondary collimator 200, each plate 220 has any plate length L that enables secondary collimator 200 as described herein. Moreover, in the exemplary and all alternative embodiments of secondary collimator 200, each successive plate has any percentage increase in length over that of the previous plate that enables secondary collimator 200 as described herein. Also, in the exemplary and all alternative embodiments of secondary collimator 200, each successive plate 220 has any hole pitch $P_y$ that enables secondary collimator 200 as described herein.

Specifically, in the exemplary and all alternative embodiments of secondary collimator 200, without limitation, plates 220 are successively arranged to define quadrilateral passages 208 such that a rate of detection of first, or non-cross-talk scatter, or legitimate x-rays 212 x-rays, is increased. Such legitimate x-rays 212 are enclosed within a legitimate x-ray 212 transit path, that is, a single such quadrilateral passage 208. Also, specifically, in the exemplary and all alternative embodiments of secondary collimator 200, without limitation, plates 220 are successively arranged to define quadrilateral passages 208 such that a rate of detection of second, or cross-talk scatter x-rays 214 is decreased. Such cross-talk scatter x-rays 214 define an x-ray transit path that intersects more than one such quadrilateral passage 208.

Figure 7:
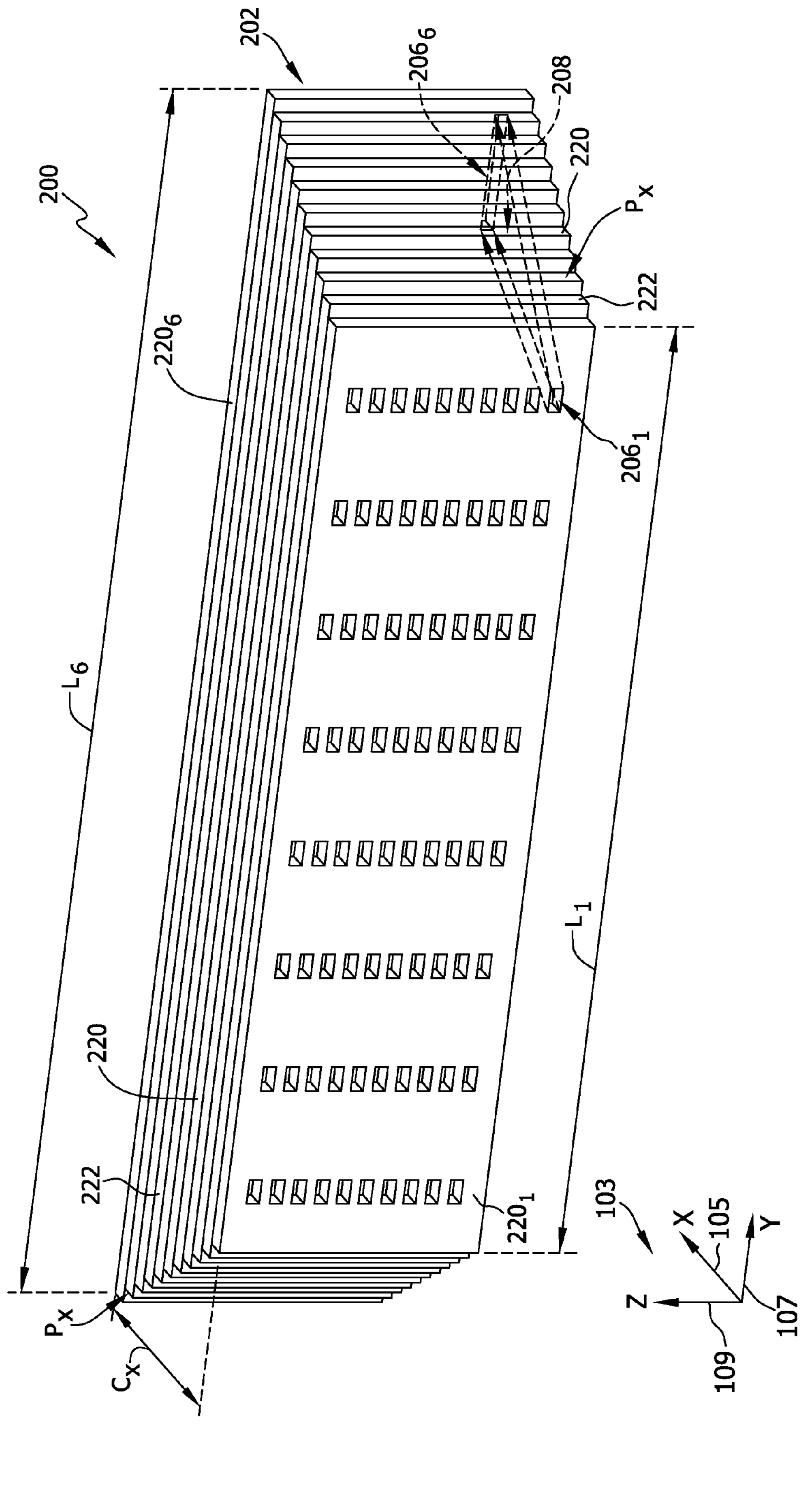

FIG. 7 is a perspective view of secondary collimator 200. In the exemplary embodiment, collimator 200 further includes a plurality of substantially rectangular spacers 222 that facilitate defining planar pitch $P_x$ between each of successive plates 220.

Figure 8A:
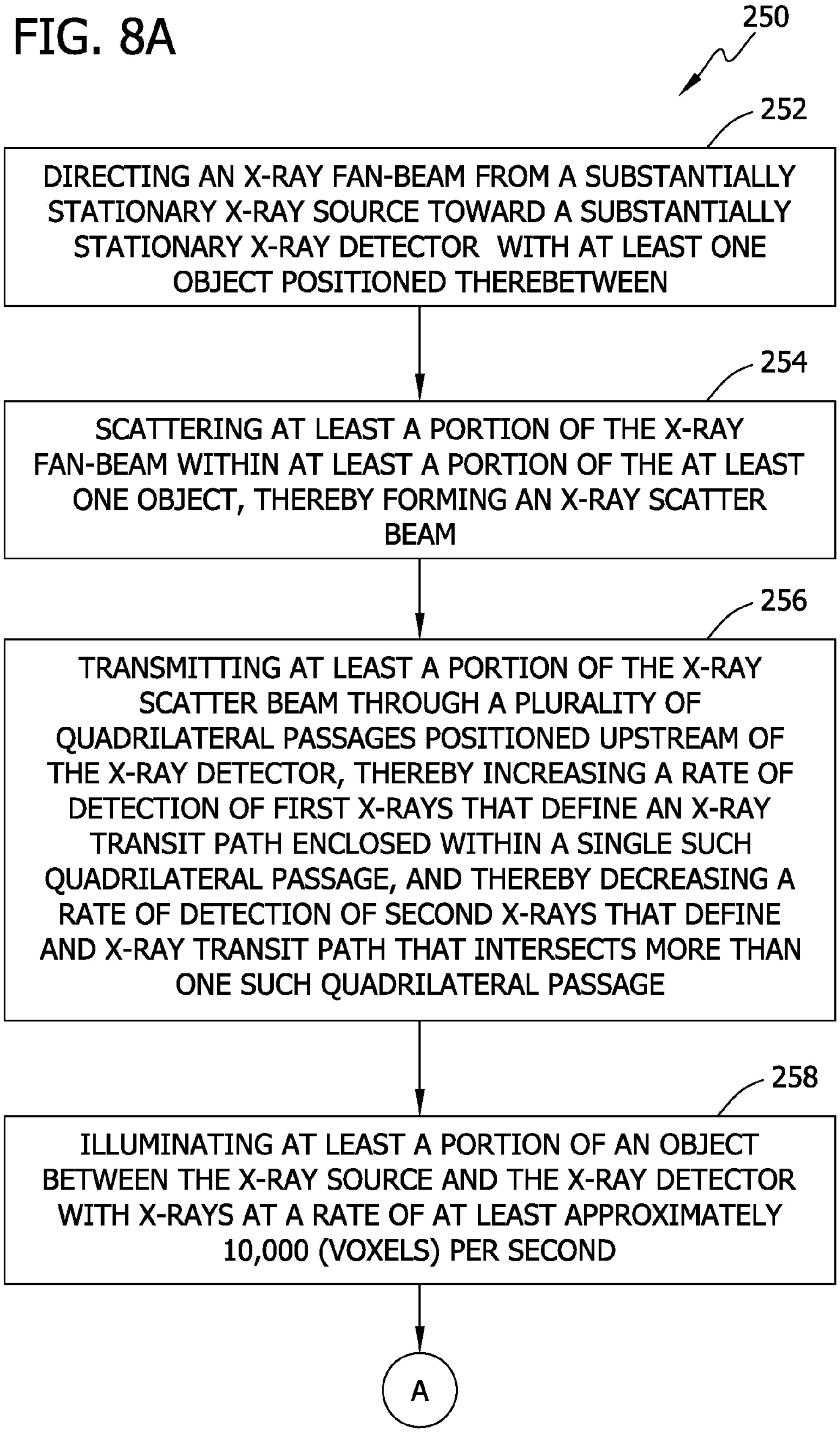
FIG. 8A is a flow chart of an exemplary method of operating the security system shown in FIG. 1.

FIG. 8A is a flow chart of an exemplary method of operating the security system 101 (shown in FIG. 1). An exemplary method for operating security system 101 (shown in FIG. 1) includes directing 252 x-ray fan-beam 136 (shown in FIG. 2) from substantially stationary x-ray source 130 (shown in FIG. 2) toward substantially stationary x-ray detector element 210 (shown in FIG. 4) with at least one object, or luggage 106 (shown in FIG. 1) positioned therebetween. The method also includes scattering 252 at least a portion of x-ray fan-beam 136 within at least a portion of luggage 106, thereby forming an x-ray scatter, or secondary beam 140.

The method further includes transmitting 256 at least a portion of x-ray fan-beam 136 through a plurality of quadrilateral passages 208 positioned upstream of substantially stationary x-ray detector element 210. Transmitting 256 at least a portion of x-ray fan-beam 136 through a plurality of quadrilateral passages 208 increases a rate of detection of first, or non-cross-talk scatter, or legitimate x-rays 212 x-rays that define an x-ray transit path, or passage 208. Such legitimate x-rays 212 are enclosed within a single such quadrilateral passage 208. Also, transmitting 256 at least a portion of x-ray fan-beam 136 through a plurality of quadrilateral passages 208 decreases a rate of detection of second, or cross-talk scatter x-rays 214 that define an x-ray transit path that intersects more than one such quadrilateral passage 208.

More specifically, transmitting 256 at least a portion of x-ray fan-beam 136 through a plurality of quadrilateral passages 208, wherein each of the plurality of quadrilateral passages 208 has a constant vertical dimension value a' and an increasing horizontal dimension value b' (both shown in FIG. 5), thereby increasing a rate of detection of non-cross-talk scatter, or legitimate x-rays 212 and decreasing a rate of detection of cross-talk scatter x-rays 214 within substantially stationary x-ray detector element 210. Quadrilateral passages 208 extend through scatter collimator 200, thereby facilitating constant angular broadening of a portion of x-ray fan-beam 136.

Method 250 also includes illuminating 258 at least a portion of object, or luggage 106 (shown in FIGS. 1 and 2) between x-ray source 130 and x-ray detector element 210 with x-rays at a rate of at least approximately 10,000 object volume elements (voxels) per second. Method 250 is continued in FIG. 8B.

Figure 8B:
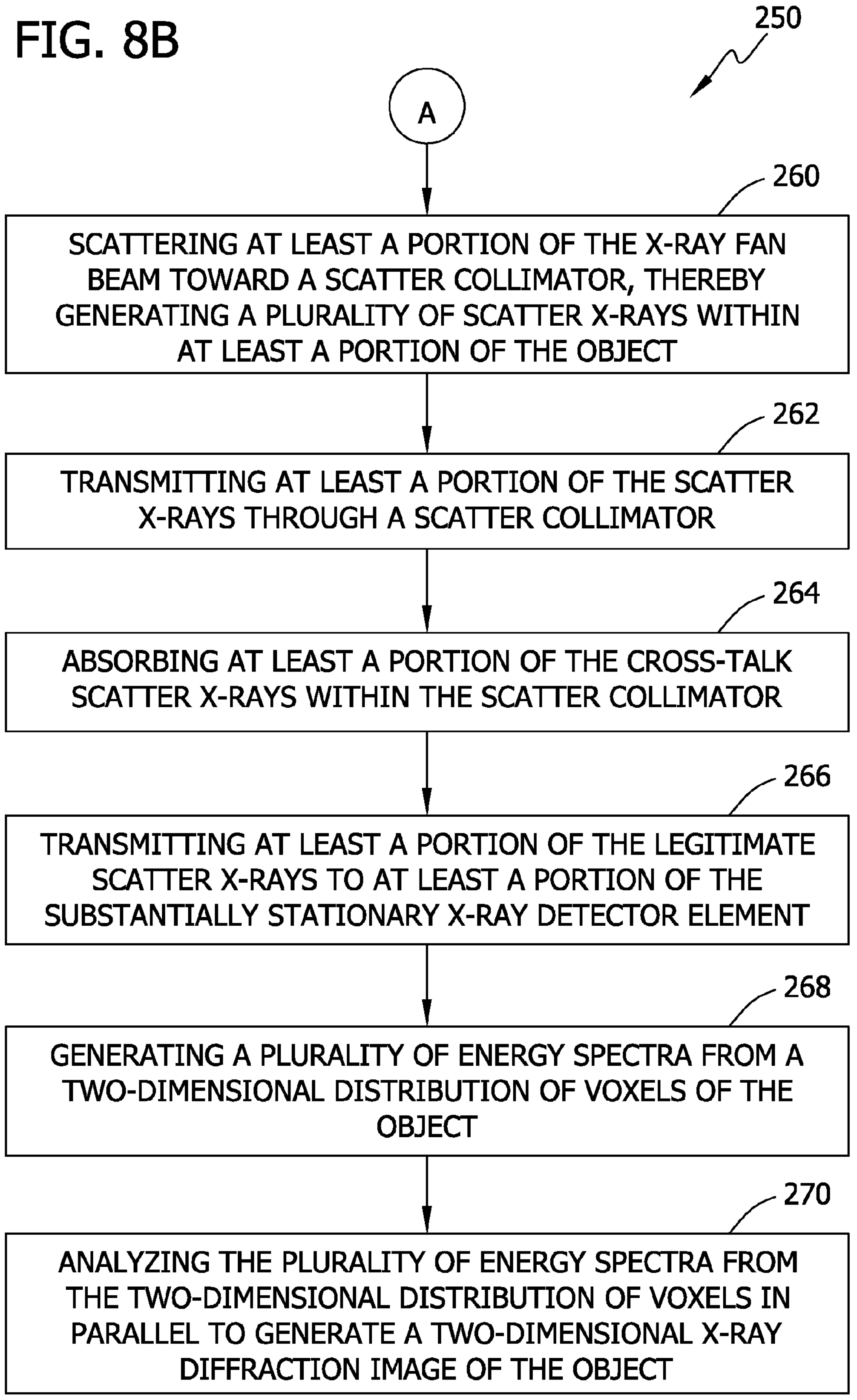
FIG. 8B is a continuation of the flow chart shown in FIG. 8A.

FIG. 8B is a continuation of the flow chart shown in FIG. 8A. Method 250 further includes scattering 260 at least a portion of x-ray fan-beam 136 from luggage 106 toward scatter collimator 200, thereby generating a plurality of scatter x-rays 142 and 144 within at least a portion of luggage 106. Method 250 further includes transmitting 262 at least a portion of plurality of scatter x-rays 142 and 144 through scatter collimator 200. Method 250 also includes absorbing 264 at least a portion of cross-talk scatter x-rays 214 within scatter collimator 200. Method 250 further includes transmitting 266 at least a portion of legitimate scatter x-rays 212 to at least a portion of substantially stationary x-ray detector element 210. Method 250 also includes generating 268 a plurality of energy spectra from a two-dimensional distribution of voxels of luggage 106. Method 250 further includes analyzing 270 the plurality of energy spectra from the two-dimensional distribution of voxels in parallel to generate a two-dimensional x-ray diffraction image of luggage 106.

The above-described method and x-ray laminography device facilitate effective and efficient operation of security systems. The security systems include an effective fan-beam x-ray diffraction imaging device that significantly decreases mechanical movements of the imaging device components and facilitates substantial parallel imaging and analysis of items under scrutiny. Specifically, such x-ray diffraction imaging device generates an x-ray fan beam in which all object volume elements (voxels) in a two-dimensional (2-D) object section are analyzed in parallel to generate a three-dimensional (3-D) image of the object and items residing therein. Also, specifically, such x-ray diffraction imaging device includes a multi-plane secondary collimator that transmits a divergent scatter x-ray fan beam utilizing a large portion of the useful scattered x-rays while decreasing cross-talk x-rays. Therefore, the method and imaging device disclosed herein results in providing the user with a visual three-dimensional (3-D) image of the items under scrutiny at a lower cost with faster results, substantially regardless of the physical attributes of the scrutinized items. Further, the method and imaging device disclosed herein may result in increasing the signal of legitimate scattered x-rays while decreasing the number of cross-talk x-rays, thereby increasing the detection rate and decreasing a number of false alarms associated with contraband substances and materials. Moreover, the fan-beam x-ray diffraction imaging device described herein has a sufficiently small footprint to facilitate inclusion within many existing security checkpoints.

Exemplary embodiments of methods and x-ray laminography device for operating a security system are described above in detail. The methods and x-ray laminography devices are not limited to the specific embodiments described herein, but rather, components of systems and/or steps of the methods may be utilized independently and separately from other components and/or steps described herein. For example, the methods may also be used in combination with other security systems and methods, and are not limited to practice with only the security systems as described herein. Rather, the exemplary embodiment can be implemented and utilized in connection with many other security system applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An x-ray diffraction imaging device, comprising:

at least one x-ray detector; and at least one scatter collimator positioned upstream of said at least one x-ray detector, said at least one scatter collimator comprising a plurality of successive plates, each successive plate of said plurality of successive plates defining a plurality of rectangular holes, each rectangular hole of the plurality of rectangular holes includes a first dimension and a substantially orthogonal second dimension that does not equal the first dimension, wherein the first dimension increases and the second dimension is substantially constant with said each successive plate in a direction towards said at least one x-ray detector, said plurality of successive plates arranged such that the plurality of rectangular holes define a plurality of widening quadrilateral passages extending through said at least one scatter collimator, wherein each of the plurality of widening quadrilateral passages is configured to increase a rate of detection of first x-rays that define an x-ray transit path enclosed within a single such widening quadrilateral passage, and the plurality of widening quadrilateral passages is configured to decrease a rate of detection of second x-rays that define an x-ray transit path that intersects more than one such widening quadrilateral passage.

2. The x-ray diffraction imaging device of claim 1 wherein said each successive plate of said plurality of successive plates is separated by a predetermined plate pitch, wherein the predetermined plate pitch is configured to decrease the rate of detection of the second x-rays, such second x-rays are cross-talk x-rays.

3. The x-ray diffraction imaging device of claim 1 wherein said plurality of successive plates comprises:

a first plate defining a plurality of rectangular first holes, each of the first holes having a first dimensional value parallel to a y-axis; and a second plate positioned downstream of said first plate, said second plate defining a plurality of rectangular second holes, each of the second holes having a second dimensional value parallel to the y-axis that is greater than the first dimensional value parallel to the y-axis in a ratio at least partially defined by a separation of said second plate and said first plate from an x-ray source.

4. The x-ray diffraction imaging device of claim 3 wherein said each successive plate of said plurality of successive plates defines a plurality of successive holes, each successive hole having:

a constant dimensional value parallel to a z-axis; and a successively increasing dimensional value parallel to the y-axis.

5. The x-ray diffraction imaging device of claim 4 wherein said at least one x-ray detector includes a rectangular hole length value parallel to the y-axis determined by the mathematical expression:

b=sqrt[8aA], wherein "b" represents the rectangular hole length value parallel to the y-axis of said at least one x-ray detector, "a" represents a rectangular hole height parallel to the z-axis of said at least one x-ray detector, and "A" represents a displacement distance value of said at least one x-ray detector away from a primary x-ray beam trajectory that is substantially orthogonal to a plane at least partially defined by said at least one x-ray detector.

6. The x-ray diffraction imaging device of claim 5 wherein each of the plurality of widening quadrilateral passages extending through said at least one scatter collimator has a constant rectangular hole height value of "a" and an increasing rectangular hole length value that approaches a value of "b" that represents a rectangular hole length value of a rectangular hole adjacent to said at least one x-ray detector.

7. An object imaging system, comprising:

at least one computer processor; and an x-ray diffraction imaging device coupled to said at least one computer processor, said x-ray diffraction imaging device comprising:

at least one x-ray detector; and at least one scatter collimator positioned upstream of said at least one x-ray detector, said at least one scatter collimator comprising a plurality of successive plates, each successive plate of said plurality of successive plates defining a plurality of rectangular holes, each rectangular hole of the plurality of rectangular holes includes a first dimension and a substantially orthogonal second dimension that does not equal the first dimension, wherein the first dimension increases and the second dimension is substantially constant with said each successive plate in a direction towards said at least one x-ray detector, said plurality of successive plates arranged such that the plurality of rectangular holes define a plurality of widening quadrilateral passages extending through said at least one scatter collimator, wherein each of the plurality of widening quadrilateral passages is configured to increase a rate of detection of first x-rays that define an x-ray transit path enclosed within a single such widening quadrilateral passage, and the plurality of widening quadrilateral passages is configured to decrease a rate of detection of second x-rays that define an x-ray transit path that intersects more than one such widening quadrilateral passage.

8. The object imaging system of claim 7 wherein said each successive plate of said plurality of successive plates is separated by a predetermined plate pitch, wherein the predetermined plate pitch is configured to decrease the rate of detection of the second x-rays, such second x-rays are cross-talk x-rays.

9. The object imaging system of claim 7 wherein said plurality of successive plates comprises:

a first plate defining a plurality of rectangular first holes, each of the first holes having a first dimensional value parallel to a y-axis; and a second plate positioned downstream of said first plate, said second plate defining a plurality of rectangular second holes, each of the second holes having a second dimensional value parallel to the y-axis that is greater than the first dimensional value parallel to the y-axis in a ratio at least partially defined by a separation of said second plate and said first plate from an x-ray source.

10. The object imaging system of claim 9 wherein said each successive plate of said plurality of successive plates defines a plurality of successive holes, each successive hole having:

a constant dimensional value parallel to a z-axis; and a successively increasing dimensional value parallel to the y-axis.

11. The object imaging system of claim 10 wherein said plurality of successive plates defines a detection solid angle and a constant angular broadening.

12. The object imaging system of claim 10 wherein said at least one x-ray detector includes a rectangular hole length value parallel to the y-axis determined by the mathematical expression:

b=sqrt[8aA], wherein "b" represents the rectangular hole length value parallel to the y-axis of said at least one x-ray detector, "a" represents a rectangular hole height parallel to the z-axis of said at least one x-ray detector, and "A" represents a displacement distance value of said at least one x-ray detector away from a primary x-ray beam trajectory that is substantially orthogonal to a plane at least partially defined by said at least one x-ray detector.

13. The object imaging system of claim 10 wherein the plurality of widening quadrilateral passages extending through said at least one scatter collimator have a constant dimensional value parallel to the z-axis and an increasing dimensional value parallel to the y-axis.

14. The object imaging system of claim 7 wherein:

said at least one detector is configured to generate a plurality of energy spectra from a two-dimensional distribution of voxels of an object; and said at least one computer processor is programmed to analyze the plurality of energy spectra from the two-dimensional distribution of voxels in parallel to generate a three-dimensional x-ray diffraction image of the object.

15. A method for operating a security system, said method comprising:

directing an x-ray fan-beam from a substantially stationary x-ray source toward a substantially stationary x-ray detector with at least one object positioned therebetween;

scattering at least a portion of the x-ray fan-beam within at least a portion of the at least one object, thereby forming an x-ray scatter beam; and transmitting at least a portion of the x-ray scatter beam through a plurality of widening quadrilateral passages positioned upstream of the x-ray detector, wherein the plurality of widening quadrilateral passages are at least partially defined via a plurality of successive plates, each successive plate of the plurality of successive plates defines a plurality of rectangular holes, each rectangular hole of the plurality of rectangular holes includes a first dimension and a substantially orthogonal second dimension that does not equal the first dimension, wherein the first dimension increases and the second dimension is substantially constant with each successive plate in a direction towards the at least one x-ray detector, wherein each of the plurality of widening quadrilateral passages is configured to increase a rate of detection of first x-rays that define an x-ray transit path enclosed within a single such widening quadrilateral passage, and the plurality of widening quadrilateral passages is configured to decrease a rate of detection of second x-rays that define an x-ray transit path that intersects more than one such widening quadrilateral passage.

16. The method of claim 15 wherein directing an x-ray fan-beam from a substantially stationary x-ray source toward a substantially stationary x-ray detector with at least one object positioned therebetween comprises illuminating at least a portion of the object with x-rays at a rate of at least approximately 10,000 object volume elements (voxels) per second.

17. The method of claim 16 wherein scattering at least a portion of the x-ray fan-beam within at least a portion of the at least one object comprises:

scattering at least a portion of the x-ray fan beam from the object toward a scatter collimator, thereby generating a plurality of scatter x-rays within at least a portion of the object; and transmitting at least a portion of the plurality of scatter x-rays through the scatter collimator.

18. The method of claim 17 wherein transmitting at least a portion of the plurality of scatter x-rays through the scatter collimator comprises:

absorbing at least a portion of cross-talk scatter x-rays within the scatter collimator; and transmitting at least a portion of legitimate scatter x-rays to at least a portion of the substantially stationary x-ray detector.

19. The method of claim 15 wherein transmitting at least a portion of the x-ray fan-beam through a plurality of quadrilateral passages positioned upstream of the x-ray detector comprises transmitting at least a portion of the x-ray fan-beam through a plurality of quadrilateral passages extending through at least a portion of a scatter collimator, thereby facilitating constant angular broadening of the at least a portion of the x-ray fan-beam.

20. The method of claim 15 wherein directing an x-ray fan-beam from a substantially stationary x-ray source toward a substantially stationary x-ray detector with at least one object positioned therebetween comprises:

generating a plurality of energy spectra from a two-dimensional distribution of voxels of the object; and analyzing the plurality of energy spectra from the two-dimensional distribution of voxels in parallel to generate a three-dimensional x-ray diffraction image of the object.

* * * * *